United States Patent
Lee

(10) Patent No.: US 7,830,651 B2
(45) Date of Patent: Nov. 9, 2010

(54) NOTEBOOK

(75) Inventor: Cheng-Lin Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 195 days.

(21) Appl. No.: 12/200,883

(22) Filed: Aug. 28, 2008

(65) Prior Publication Data
US 2009/0316347 A1 Dec. 24, 2009

(30) Foreign Application Priority Data
Jun. 18, 2008 (CN) .................. 2008 1 0302174

(51) Int. Cl.
G06F 1/16 (2006.01)
(52) U.S. Cl. .................. 361/679.26; 361/679.27; 361/679.55; 345/98; 345/156; 345/905
(58) Field of Classification Search ............ 361/679.09
See application file for complete search history.

(56) References Cited

U.S. PATENT DOCUMENTS

| | | | | |
|---|---|---|---|---|
| 5,872,515 A * | 2/1999 | Ha et al. | ............. | 340/571 |
| 6,076,011 A * | 6/2000 | Hoover | ............. | 600/546 |
| 6,124,806 A * | 9/2000 | Cunningham et al. | .. | 340/870.02 |
| 6,125,449 A * | 9/2000 | Taylor et al. | ............. | 713/310 |
| 6,349,386 B1 * | 2/2002 | Chan | ............. | 713/323 |
| 6,654,896 B1 * | 11/2003 | Saunders et al. | ............. | 713/323 |
| 6,816,141 B1 * | 11/2004 | Fergason | ............. | 345/88 |
| 6,865,621 B2 * | 3/2005 | Iwata | ............. | 710/20 |
| 6,876,348 B2 * | 4/2005 | Murata et al. | ............. | 345/90 |
| 6,944,496 B2 * | 9/2005 | Jeong et al. | ............. | 600/546 |
| 7,098,899 B1 * | 8/2006 | Ginosar | ............. | 345/204 |
| 7,126,588 B2 * | 10/2006 | Oakley | ............. | 345/169 |
| 7,240,189 B2 * | 7/2007 | Mowery et al. | ............. | 713/2 |
| 7,257,430 B2 * | 8/2007 | Lenchik et al. | ............. | 455/575.3 |
| 7,320,112 B2 * | 1/2008 | Yamaguchi et al. | ............. | 715/831 |
| 7,492,583 B2 * | 2/2009 | Lv | ............. | 361/679.26 |
| 7,676,368 B2 * | 3/2010 | Shizuka et al. | ............. | 704/260 |
| 2002/0087747 A1 * | 7/2002 | Yamaguchi et al. | ............. | 710/1 |
| 2002/0172002 A1 * | 11/2002 | Sasaki et al. | ............. | 361/683 |
| 2004/0160734 A1 * | 8/2004 | Yim | ............. | 361/681 |
| 2005/0219193 A1 * | 10/2005 | Nagaoka et al. | ............. | 345/98 |
| 2005/0264990 A1 * | 12/2005 | LaGarde | ............. | 361/683 |
| 2006/0095797 A1 * | 5/2006 | Hung | ............. | 713/300 |
| 2006/0256144 A1 * | 11/2006 | Chung | ............. | 345/905 |
| 2007/0118799 A1 * | 5/2007 | Kao et al. | ............. | 715/701 |
| 2007/0239863 A1 * | 10/2007 | Aoyagi et al. | ............. | 709/223 |
| 2007/0242421 A1 * | 10/2007 | Goschin et al. | ............. | 361/681 |
| 2008/0158138 A1 * | 7/2008 | Yamazaki et al. | ............. | 345/102 |
| 2009/0009952 A1 * | 1/2009 | Lv | ............. | 361/683 |

* cited by examiner

Primary Examiner—Jayprakash N Gandhi
Assistant Examiner—Anthony Q Edwards
(74) Attorney, Agent, or Firm—Frank R. Niranjan

(57) ABSTRACT

A notebook includes a host, a monitor, a power source, a system switch, a system button, a monitor switch, and a monitor button. The power source is used for supplying electric power to the host and the monitor. The system button is configured for controlling the system switch to power on or power off the host. The monitor button is configured for controlling the monitor switch to power on or power off the monitor when the host is turned on.

16 Claims, 1 Drawing Sheet

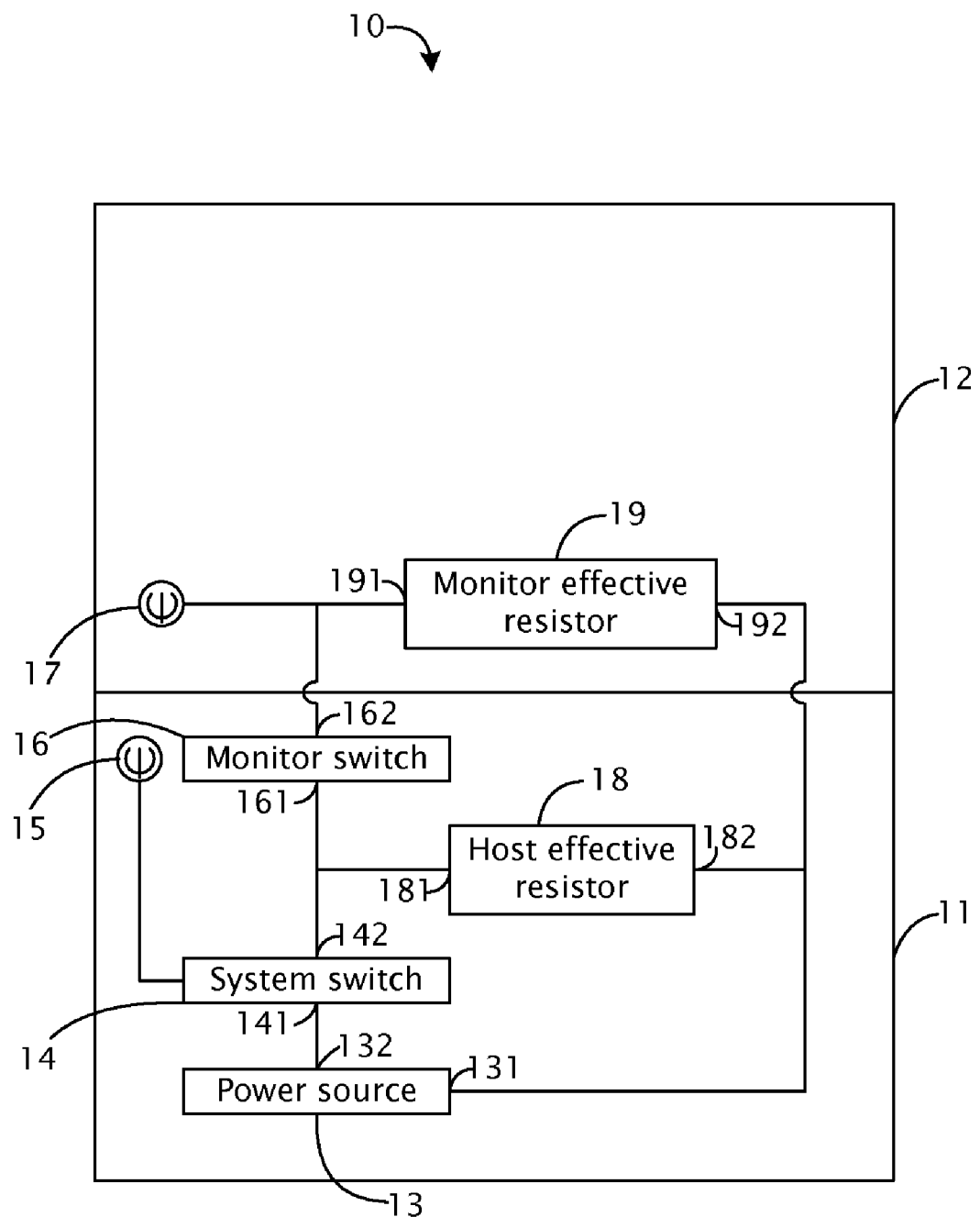

NOTEBOOK

BACKGROUND

1. Technical Field

The present invention relates to notebooks and, particularly, to a notebook capable of individually shutting off the monitor thereof.

2. Description of the Related Art

Occasionally, you may want to turn off the monitor of your notebook while leaving the host turned on in order to save electricity. This can be achieved by Power Options in Windows®, which contains a setting to automatically shut off the monitor after a predetermined amount of time for which your notebook has been idle. One of the disadvantages of this option is that the monitor may turn off inconveniently. Therefore, it is preferable, in certain situation, to manually turn off the monitor. Some notebooks already allow users to manually turn off the monitor via keyboard shortcuts, e.g., "FN+F6". Typically, the monitor will be turned back on when any key has been pressed. Moreover, even a minor disturbance can turn on the monitor. As a result, the monitor will be on when not needed thereby wasting electricity.

Therefore, it is desirable to provide a notebook capable of individually shutting off the monitor thereof, which can overcome the above mentioned problem.

SUMMARY

In an exemplary embodiment, a notebook includes a host, a monitor, a power source, a system switch, a system button, a monitor switch, and a monitor button. The power source is for supplying electric power to the host and the monitor. The system button is configured for controlling the system switch to switch on and power off the host. The monitor button is configured for controlling the monitor switch to switch on and power off the monitor when the host is turned on.

BRIEF DESCRIPTION OF THE DRAWINGS

The FIGURE is a functional block diagram of a notebook, according to an exemplary embodiment.

DETAILED DESCRIPTION OF THE EMBODIMENTS

Embodiments of the present notebook will now be described in detail with references to the accompanying drawings.

Referring to the FIGURE, a notebook 10, according to an exemplary embodiment, includes a host 11, a monitor 12, a power source 13, a system switch 14, a system button 15, a monitor switch 16, and a monitor button 17. The power source 13 is for supplying electric power to the host 11 and the monitor 12. The system button 15 is configured for controlling the system switch 14 to switch on and off the host 11. The monitor button 17 is configured for controlling the monitor switch 16 to switch on and off the monitor 12 when the host 11 is turned on.

The host 11 is configured for information processing and typically includes a housing and a set of electronic components, such as a central processing unit (CPU), a North Bridge chip, a graphic card, a hard disk, and an audio card. The equivalent resistance of the sum total of the resistance of the electronic components of the host 11 is shown as the host effective resistor 18 in the FIGURE.

The monitor 12, such as a liquid crystal display, is configured for information processing and typically includes an array of electrically controllable light valves (pixels) and a driver. The equivalent resistance of the sum total of the resistance of the light valves and driver is shown as the monitor effective resistor 19 in the FIGURE.

The power source 13 can be an external power source or an internal power source such as a battery. In this embodiment, an electrode 132 of the power source 13, e.g., the anode is directly connected to an end 141 of the system switch 14 and the other electrode 131, e.g., the cathode, is directly connected to an end 182 of the host effective resistor 18. The opposite ends 142, 181 of the system switch 14 and the host effective resistor 18 are directly connected. When the system switch 14 is on under control of the system button 15, the power source 13, the system switch 14 and the host effective resistor 18 form a closed loop. In this case, the host 11 is powered on. When the system switch 14 is turned off using the system button 15, the loop is now opened, and the host 11 is off.

The opposite end 142 of the system switch 14 is also directly connected to an end, 161, of the monitor switch. The other electrode 131 of the power source 13 is also connected to an end 192 of the monitor effective resistor 19. The opposite ends 162, 191 of the monitor switch 16 and the monitor effective resistor 19 are directly connected. Therefore, when the system switch 14 is on under control of the system button 15, the power source 13, the system switch 14, the monitor switch 16 and the monitor effective resistor 19 will form a closed circuit once the monitor switch 16 is turned on by the monitor button 17. However, this closed circuit will be disconnected once the monitor switch 16 has been broken. That is, the monitor switch 16 can, under control of the monitor button 17, turn on and off the monitor 12 when the host 11 is turned on.

The detailed electrical connections is not limited by this embodiment and can be changed to its equivalents as needed.

The system switch 14 and the monitor switch 16 can be a touch switch. Accordingly, the system button 15 and the monitor button 17 is a pressing member, e.g., a rubber sheet, covering the corresponding touch switch. The system switch 14 can be housed within the host 11, and the system button 15 can be placed on the surface of the host 11, e.g., the key pad area of the host 11. The monitor switch 16 can be housed within the monitor 12, and the monitor button 17 can be placed on the surface of the monitor 12, e.g., the outer periphery of the monitor screen. However, the locations of the switches 14, 16 and the buttons 15, 17 are flexible depending on requirements.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A notebook comprising:
   a host;
   a monitor;
   a power source for supplying power for the host and the monitor;
   a system switch;
   a system button configured for controlling the system switch to power the host on and off;

a monitor switch; an electrode of the power source being electrically connected to an end of the system switch, the other electrode of the power source being electrically connected to an end of the host and to an end of the monitor, the opposite end of the system switch being electrically connected to the opposite end of the host and an end of the monitor switch, the opposite end of the monitor switch and the monitor being electrically connected and a monitor button configured for controlling the monitor switch to power the monitor on and off.

2. The notebook as claimed in claim 1, wherein the monitor comprises a liquid crystal display.

3. The notebook as claimed in claim 1, wherein the power source is selected from the group consisting of an external source or a battery.

4. The notebook as claimed in claim 1, wherein the system switch comprises a touch switch.

5. The notebook as claimed in claim 4, wherein the system button comprises a pressing member covering the system switch.

6. The notebook as claimed in claim 5, wherein the system button is housed within the host, the system button being placed on the surface of the host.

7. The notebook as claimed in claim 1, wherein the monitor switch comprises a touch switch.

8. The notebook as claimed in claim 7, wherein the monitor button comprises a pressing member covering the monitor switch.

9. The notebook as claimed in claim 8, wherein the monitor button is housed within the monitor, the monitor button being placed on the surface of the monitor.

10. A notebook comprising:

a power source;

a host;

a monitor;

a system switch; and a monitor switch; an electrode of the power source being electrically connected to an end of the system switch, the other electrode of the power source being electrically connected to an end of the host and to an end of the monitor, the opposite end of the system switch being electrically connected to the opposite end of the host and an end of the monitor switch, the opposite end of the monitor switch and the monitor being electrically connected.

11. The notebook as claimed in claim 10, wherein the monitor comprises a liquid crystal display.

12. The notebook as claimed in claim 10, wherein the power source is selected from the group consisting of an external source or a battery.

13. The notebook as claimed in claim 10, further comprising a system button, the system button being configured for controlling the system switch to be turned on and broken.

14. The notebook as claimed in claim 10, further comprising a monitor button, the monitor button being configured for controlling the monitor switch to be turned on and broken.

15. The notebook as claimed in claim 10, wherein the system switch comprises a touch switch.

16. The notebook as claimed in claim 10, wherein the monitor switch comprises a touch switch.

* * * * *